(No Model.)
U. & H. E. EBERHARDT.
CHIP CLEARER FOR GEAR CUTTING MACHINES.
No. 321,698. Patented July 7, 1885.
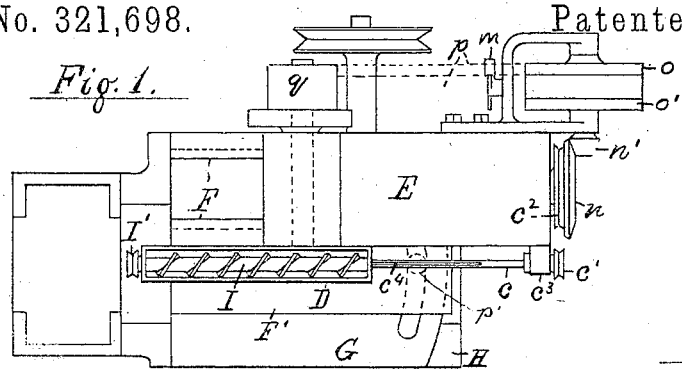
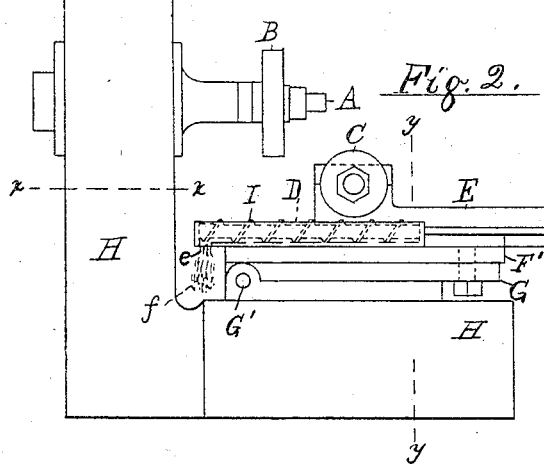
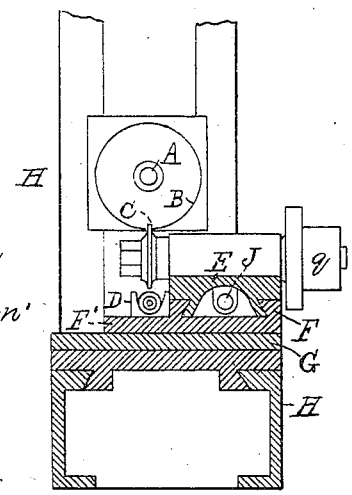
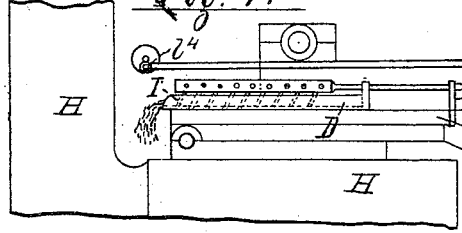
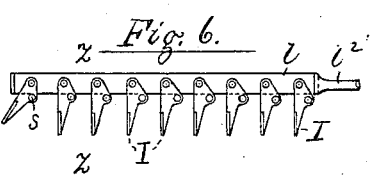
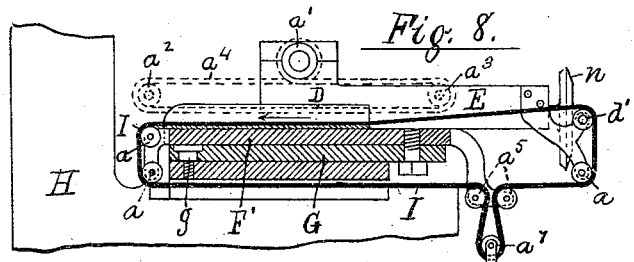
Attest.
H. J. Theberath.
L. Lee.
Inventor.
U. & H. E. Eberhardt per
Thos. S. Crane, Atty.

UNITED STATES PATENT OFFICE.

ULRICH EBERHARDT AND HENRY E. EBERHARDT, OF NEWARK, NEW JERSEY.

CHIP-CLEARER FOR GEAR-CUTTING MACHINES.

SPECIFICATION forming part of Letters Patent No. 321,698, dated July 7, 1885.

Application filed June 10, 1884. (No model.)

*To all whom it may concern:*

Be it known that we, ULRICH EBERHARDT and H. E. EBERHARDT, citizens of the United States, residing in Newark, Essex county, New Jersey, have invented certain new and useful Improvements in Milling-Machines, fully described and represented in the following specification and the accompanying drawings, forming a part of the same.

This invention consists in an automatic device for removing the chips from the beds of milling-machines of various kinds, and is shown herein as applied to a machine for milling the teeth in blank gear-wheels, the machine shown being analogous to that shown in our patent application No. 114,205, pending herewith.

In the drawings, Figure 1 is a plan of the frame and bed of a gear-cutter in section on line $x$ $x$ in Fig. 2, the drawing showing chiefly such parts of the machine as are directly connected with the present invention, and the chip-clearer being shown in the form of a rotary screw. Fig. 2 is a side view of the same, with the gear-arbor and blank-gear mounted thereon. Fig. 3 is a front view of the same in section on line $y$ $y$ in Fig. 2. Fig. 4 is a side view like Fig. 2, without the blank gear and arbor, and the clearer being shown as a series of reciprocating hinged scrapers. Fig. 5 is a plan of the scraper-frame attached. Fig. 6 is a side view of the same with the scrapers, one of the latter being shown in a tipped position; and Fig. 7 is a section of the same on line $z$ $z$ in Fig. 6. Fig. 8 is a side view of the same machine on line $d$ $d$ in Fig. 9, the clearer being shown as a continuous belt, cord, or chain traveling over pulleys; and Fig. 9 is a front view of the parts shown in Fig. 8.

A is the gear-arbor; B, the blank gear; C, the cutter for cutting the teeth; D, a receptacle beneath the cutter, into which the chips fall; E, the cutter-slide; F, its guides, formed on a bed, F', the latter being pivoted, as at $g$ in Fig. 8, upon a table, G, so as to be adjusted to horizontal angles, and then clamped by the bolt $p'$, Fig. 1. The table G is fitted to the frame H in the usual manner, with means for tipping it at G'; but these constructive features are not material to the invention.

In the drawings, the clearer is shown in three different forms: first, as a rotating worm or screw; second, as a series of reciprocating scrapers, and, third, as a traveling belt or carrier. In the first the clearer is merely rotated in a fixed position relative to the bed and to its bearings thereon, but in the two latter forms the clearer is moved bodily with the chips to carry them to the outlet, where they are discharged; the second construction presenting an alternate movement to and from such outlet, and the third consisting in a carrier-belt moved endlessly over its grinding and driving pulleys.

The first construction is not claimed herein, but has been secured in the said patent application No. 114,205, pending simultaneously herewith, and our present claims are herein restricted to a clearer moved bodily toward the chip-discharge outlet, as in the second and third forms just described.

Figs. 1, 2, and 3 show the clearer I as a worm rotating in the receptacle or chip-holder D, which latter is shown as a trough provided with a chip-discharge outlet, $e$, at one end, from which the worm ejects the chips $f$.

In Figs. 1 and 2 the means for rotating the worm are shown as a shaft, $c$, and pulley $c'$, actuated by a pulley, $c^2$, upon the head of the slide-feed screw J, Fig. 3. The shaft $c$ is journaled in a bearing, $c^3$, at the outer end of the slide, and consequently moves endwise as the slide is fed forward in its guides F. The shaft is therefore fitted to slide in and out of a key in the hub of the worm, and is provided with a long keyway, $c^4$, Fig. 1, to rotate the same as it slides.

The feed-screw J is rotated and reversed by different means in various machines, that shown herein consisting in bevel-gears $n$ $n'$ and pulleys $o$ $o'$, the latter being operated by straight and crossed belts $p$ from a pulley, $q$, on the cutter-spindle. A shifter for moving the belts and reversing the screw is merely indicated at $m$ in Fig. 1; but the devices for operating the shifter and belts are not shown, as they form no part of the present invention.

A belt applied to the pulleys $c'$ and $c^2$ obviously rotates the clearer I at the same time and in the same direction as the feed-screw J, and would therefore turn the worm in the wrong direction when the feed-screw and slide were reversed to withdraw the cutter from the gear B. This, however, is not objectionable, as the cutter produces no chips during such retraction.

In Figs. 4, 5, 6, 7 is shown a clearer consisting in a series of scrapers, I, hinged in a frame, $l$, the latter being reciprocated by a crank or connection operated by any of the means described herein. With this form of clearer a trough to retain the chips is not material, but is preferable, and is shown in Fig. 4 at D. The scrapers are formed as a series of plates hinged to hang down from the frame $l$, which latter is reciprocated by a rod, $l^2$, and the rod is passed through a guide, $l^3$, to sustain it above the bottom of the trough at a proper height. The method of pivoting the scrapers to the frame is fully shown in Figs. 5, 6, and 7, and each scraper is shown provided with a stud, $s$, which prevents it from swinging backward beyond its vertical position. As the frame $l$ reciprocates the scrapers are pushed alternately back and forth upon the bottom of the trough, yielding at their pivots and sliding over the chips in their backward movement, as shown in Fig. 4, but resting against the studs $s$ and pushing the chips before them on their forward stroke. The chips are thus intermittently but rapidly pushed from the surface upon which they fall and discharged through any aperture within the reach of the scrapers. The rod $l^2$ is shown reciprocated by a crank, $l^4$, which may be rotated in some convenient manner, as described, for the traveling clearer in Fig. 8.

In Figs. 8 and 9 is shown an endless traveling clearer formed of a cord, chain, or belt, I, traversed through the trough D by suitable means and guided over pulleys $a\ a\ a\ d'$, so as to pass entirely around the bed F' and table G.

As the clearer operates upon a fixed surface or bed while the slide E travels back and forth, it is obvious that any connection between the clearer and feed-screw must possess means for automatic adjustment to the change of position in the moving slide. This is effected by the long keyway shown in the shaft $c$ in Fig. 1, but may be obtained in other ways. Thus, the cutter-spindle C' may have a pulley operating upon an endless belt wrapped around such pulley and guided over stationary pulleys, any of which will furnish a rotary motion at a fixed point. Such a construction is indicated in the pulleys $a'$, $a^2$, and $a^3$ in Fig. 8, and belt $a^4$. The pulley $a^2$ would in practice be mounted in fixed bearings upon the bed F', and the desired motion could readily be conveyed from it to the nearest pulley $a$, and the clearer thus constantly actuated when the cutter was in motion.

The pulleys $a'$, $a^2$, $a^3$, and belt $a^4$ are only indicated by dotted lines to illustrate the mechanical motion described; but when a flexible cord or belt is used as a clearer the construction may contain a compensation device, as indicated in Fig. 8, wherein a loop of the said cord is shown carried over two guide-pulleys, $a^5$, and provided with a loose running weight, $a^6$, hung in the loop of the rope by a pulley, $a^7$. The weight thus keeps the cord or strap tight in the varying position of the slide, so that it operates uniformly in the trough D. The motion is shown transmitted to the cord or strap I by a pulley, $d'$, actuated by a bevel-gear, $n'$, in contact with the gear $n$ upon the end of the feed-screw. The pulley $d'$ is formed in one piece with a clutch-hub, $d^2$, with a journal between the two, and a bearing for the journal is provided upon the slide E at the end of a shaft, $d^3$, to which the bevel-pinion $n'$ is attached. A sliding clutch-piece, $d^4$, is fitted to a key on said shaft, and is pressed toward the clutch-hub $d^2$ by a spring, $d^5$, the teeth in the clutch being so inclined as to rotate the pulley $d'$ only when the screw is operated to feed the cutter into its work. When the motion of the screw is reversed, the spring yields and the inclined clutch-teeth slip past one another, and the motion of the clearer I is automatically arrested until the feeding is recommenced.

It is apparent that the invention may be applied to any form of milling-machine, and that its operation would be the same if the slide E were arranged to carry the material operated upon instead of the rotary cutter, which in such case would be mounted in fixed bearings, the variations in the machine requiring simply that the clearer should be properly disposed in the path of the falling chips, so as to traverse the locality where the chips tend to accumulate, and to push them to some discharge-outlet where they may fall away from the operative parts.

The advantage of the invention will be seen in the fact that a large gear-cutter produces many hundred pounds of chips daily, and that they require to be frequently removed from the vicinity of the operative parts to avoid fouling or clogging the latter.

Our invention also prevents the cutting of the sliding surfaces by the finer particles of the chips, which chips operate very much like emery when intruded between the wearing-surfaces.

We therefore claim our invention as follows:

1. The mechanism for clearing the chips from the bed of a milling-machine, which consists in a clearer placed in the path of the falling chips, means for moving the clearer bodily toward the chip-discharge outlet, and a connection between such means and the revolving cutter for actuating the clearer in the prescribed manner, substantially as herein set forth.

2. The combination, with the bed of a milling-machine, of a reciprocating-clearer arranged in the path of the falling chips, and consisting of the frame $l$ and the hinged scrapers I, means for reciprocating the clearer backward and forward among the chips, and a connection to the revolving cutter for operating such clearer, substantially as shown and described.

3. The combination, with the cutter C and its movable slide E, of the table G, adjustable in a vertical plane upon its pivot G', a clearer arranged in the path of the falling chips, and mechanism mounted upon the table and movable therewith for moving the clearer bodily toward the chip-discharge outlet, substantially as herein set forth.

In testimony whereof we have hereunto set our hands in the presence of two subscribing witnesses.

ULRICH EBERHARDT.
HENRY E. EBERHARDT.

Witnesses:
THOS. S. CRANE,
H. J. THEBERATH.